(12) United States Patent
Shafer

(10) Patent No.: US 7,810,578 B2
(45) Date of Patent: Oct. 12, 2010

(54) NUTRIENT DEVICE AND METHOD

(76) Inventor: Edward Lee Shafer, 1007 Nodaway St., Corning, IA (US) 50841

( * ) Notice: Subject to any disclaimer, the term of this patent is extended or adjusted under 35 U.S.C. 154(b) by 97 days.

(21) Appl. No.: 12/341,641

(22) Filed: Dec. 22, 2008

(65) Prior Publication Data

US 2010/0155090 A1    Jun. 24, 2010

(51) Int. Cl.
*A01B 5/00* (2006.01)
*A01B 7/00* (2006.01)

(52) U.S. Cl. .................. 172/538; 111/136; 111/139

(58) Field of Classification Search ......... 111/134–139, 111/59, 62, 190–196, 157, 163–168; 172/518, 172/538, 624.5, 307, 484, 551, 166, 705
See application file for complete search history.

(56) References Cited

U.S. PATENT DOCUMENTS

| D245,695 | S |  | 9/1977 | Watts |  |
|---|---|---|---|---|---|
| 4,051,902 | A |  | 10/1977 | Van Der Lely |  |
| 4,060,134 | A |  | 11/1977 | Van Der Lely |  |
| 4,126,185 | A |  | 11/1978 | Van Der Lely |  |
| 4,307,674 | A |  | 12/1981 | Jennings et al. |  |
| 4,930,431 | A |  | 6/1990 | Alexander |  |
| 5,709,271 | A |  | 1/1998 | Bassett |  |
| 5,752,454 | A | * | 5/1998 | Barton | 111/167 |
| 5,970,892 | A | * | 10/1999 | Wendling et al. | 111/139 |
| 6,253,692 | B1 | * | 7/2001 | Wendling et al. | 111/139 |
| 7,681,656 | B2 | * | 3/2010 | Jagow et al. | 172/538 |
| 2004/0149186 | A1 |  | 8/2004 | Stark et al. |  |

* cited by examiner

*Primary Examiner*—Robert E Pezzuto
(74) *Attorney, Agent, or Firm*—McKee, Voorhees & Sease, P.L.C.

(57) ABSTRACT

The nutrient device of the present invention includes a ground having a ground surface. The coulter is mounted for rotation about a coulter axis and the coulter penetrates the ground and makes the ground penetration below the ground surface. A cleaning wheel is mounted for rotation about a cleaning wheel axis, and the cleaning wheel extends upwardly from engaging the coulter to a cleaning wheel point spaced away from the coulter. A conduit is positioned to deliver a nutrient onto the coulter for dispensing the nutrient into the ground penetration. A closing wheel is positioned adjacent the rear of the coulter and the cleaning wheel for closing the ground penetration.

12 Claims, 7 Drawing Sheets

NUTRIENT DEVICE AND METHOD

BACKGROUND OF THE INVENTION

The present invention relates to a nutrient device and method for using same.

In the prior art there have been numerous features that are deficient. One of these features is the cleaning of the coulters. The present device provides cleaning wheels that touch the coulters at a desired location. Also there are two holes in the rigid conduit. One of these holes provides a cleaning action by nutrient spilling out of the hole onto the coulter.

Another problem is that the coulters do not have proper angles. The present invention accomplishes each of these angles by having a narrower top than bottom and by having a narrower front than rear.

Another problem is the flexibility between the cleaning wheels and the coulters. The present invention utilizes a flexible device which permits the coulters to move with respect to the cleaning wheels.

Another problem is the proper application of nutrients or manure to the soil. The present invention utilizes a device that places the nutrients or manure below the soil and repairs the soil so that the nutrients or manure are completely below the soil.

Another problem is that the device produces smell after application. This problem is countered by closing wheels that reduce the smell of the nutrient after the device has deposited the manure or nutrient thereon.

Therefore, a primary object of the present invention is the provision of a nutrient device and method which constitutes an improvement over prior devices.

A further object of the present invention is the provision of a nutrient device and method which include cleaning wheels that touch and clean the coulters.

A further object of the present invention is the provision of a nutrient device and method which includes manure or nutrient spouts that clean the coulters and which place the manure or nutrients below the soil.

A further object of the present invention is the provision of a nutrient device and method which minimizes the manure or nutrients smell after depositing the manure or nutrients below the soil.

A further object of the present invention is the provision of a nutrient device and method which holds the smell of the manure or nutrients to a minimum after application.

A further object of the present invention is the provision of a nutrient device and method which includes coulters that taper from front to back progressively and also taper from top to bottom progressively.

Another object of the present invention is the provision of a nutrient device and method which includes cleaning wheels that are wide and are disposed at an angle front to back and top to bottom.

A further object of the present invention is the provision of a back-up wheel which is disposed at the same angle as the coulters and rotates about the same axis as the coulters.

A further object of the present invention is the provision of a device which includes closer wheels that close the ground after it has been sliced by the coulters and the manure or nutrients are placed beneath the soil.

Another object of the present invention is the provision of closer wheels that are canted inwardly.

A further object of the present invention is the provision of a spring of a relief between the coulter and the cleaning wheels.

Another object of the present invention is the provision of a device which includes spouts connected to a source of manure or nutrients and have a small opening above the lower end of the spouts for spreading on the coulter and have a larger opening for depositing on the coulter and applying beneath the ground.

A further object of the present invention is the provision of a device which is convenient, efficient in operation, and places manure or nutrients below the ground.

BRIEF SUMMARY OF THE INVENTION

The foregoing objects may be achieved by an invention which includes a nutrient device comprising a ground having a ground surface. A coulter is mounted for rotation about a coulter axis, and the coulter penetrates the ground and makes a ground penetration below the ground surface. A cleaning wheel is mounted for rotation about a cleaning wheel axis, the cleaning wheel having a circumferential flange parallel to the cleaning wheel axis. The circumferential flange of the cleaning wheel engages the coulter below the axis of the coulter and above the ground penetration of the coulter. The cleaning wheel extends upwardly from engaging the coulter to a cleaning wheel point spaced away from the coulter. A conduit having an outlet positioned to deliver a nutrient onto the coulter for dispensing the nutrient into the ground penetration. A closing wheel is located to the rear of the coulter and the cleaning wheel for closing the ground penetration.

According to another feature of the present invention, the conduit has a hole above the outlet of the conduit, the hole being for cleaning the coulter.

According to another feature of the present invention, the nutrient device includes a deflector for deflecting a portion of the fertilizer towards the coulter, the remaining fertilizer being directed to the outlet of the conduit.

According to another feature of the present invention, the nutrient device includes a closing wheel which is canted with respect to the coulter.

According to another feature of the present invention, the device includes a back-up wheel which is mounted adjacent to the coulter and includes a lower edge that is placed slightly above the lower edge of the circumferential flange of the cleaning wheel.

According to another feature of the present invention, the method for operating the nutrient device comprises operating a frame in a directional movement on a surface of the ground so that the frame has a rearward end and a forward end. The coulter is penetrated below the surface of the ground to a ground penetration level. The rotation of a cleaning wheel is provided about a cleaning wheel axis, the cleaning wheel having a lower edge and extending upwardly to an upper edge. The lower edge of the cleaning wheel is in close proximity to the coulter below the coulter axis and above the ground penetration level. The cleaning wheel is extended upwardly from the lower edge of the cleaning wheel away in spaced relationship from the coulter. A conduit is positioned for delivery of a nutrient onto the coulter whereby the nutrient passes from the coulter to the ground penetration. The closing wheel is pressed downwardly at the rearward end of the coulter for closing the surface of the ground.

According to another feature of the present invention the conduit includes an upper hole that produces a cleaning action on the coulter to keep the coulter clean.

DETAILED DESCRIPTION OF THE PREFERRED EMBODIMENT

Figure 1:
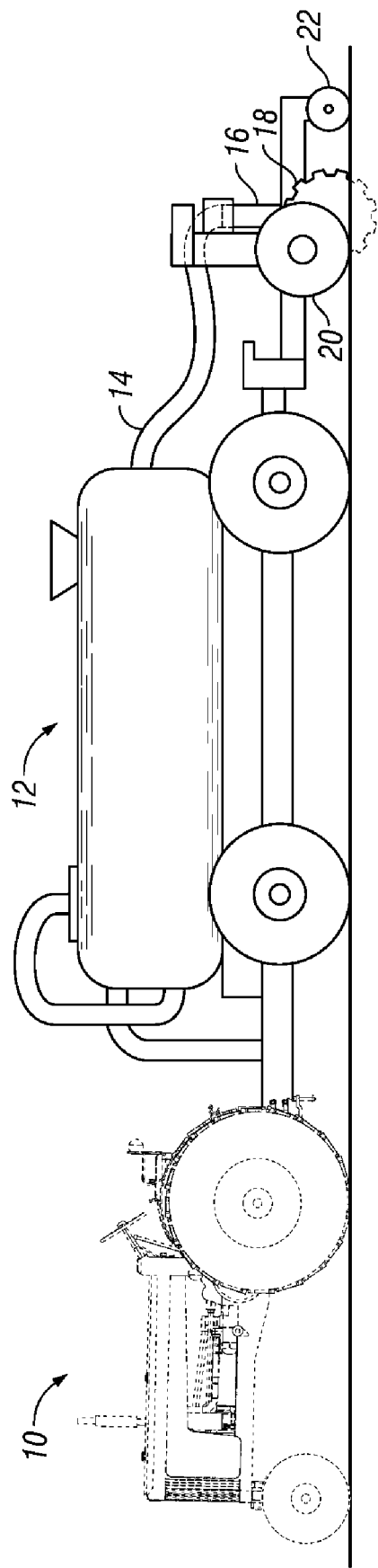
FIG. 1 is an elevational view of the tractor, the wagon, and the nutrient device.

Referring to FIG. 1, a tractor 10 is shown pulling a nutrient carrier 12. A flexible hose 14 is connected to a rigid conduit 16 which in turn is mounted to a coulter 18 penetrating below the surface of the ground. A cleaning wheel 20 is provided with its lower edge engaging the coulter 18 below the axis 25 (FIG. 3) of the coulter 18. A closer wheel 22 is provided for closing the soil after the manure or nutrients have been deposited below the ground.

A back-up wheel 24, shown in FIGS. 2, 3, 7, and 8, rotates on the same axis as the axis to the coulters provided by axle 25. The back-up wheel 24 is independently rotatable with respect to the coulter 18. Cleaning wheel 20 includes a rim or flange 26 mounted thereon.

A cleaning wheel axis 28 is provided by an axis which is at the lower end of vertical member 30. A cross member 32 is welded to the upper ends of vertical members 30.

A pair of adjustment bars 34 each include an upper end 36 that is welded to cross member 32 and a lower end 38 that is welded to the lower end of vertical bar 30 and adjustment nuts 39 for adjusting the distance between the welded portion of adjustment bars 34 and the cross member 32. Thus it is possible by turning nut 39 adjust the distance between the lower ends of axles 28.

Figure 2:
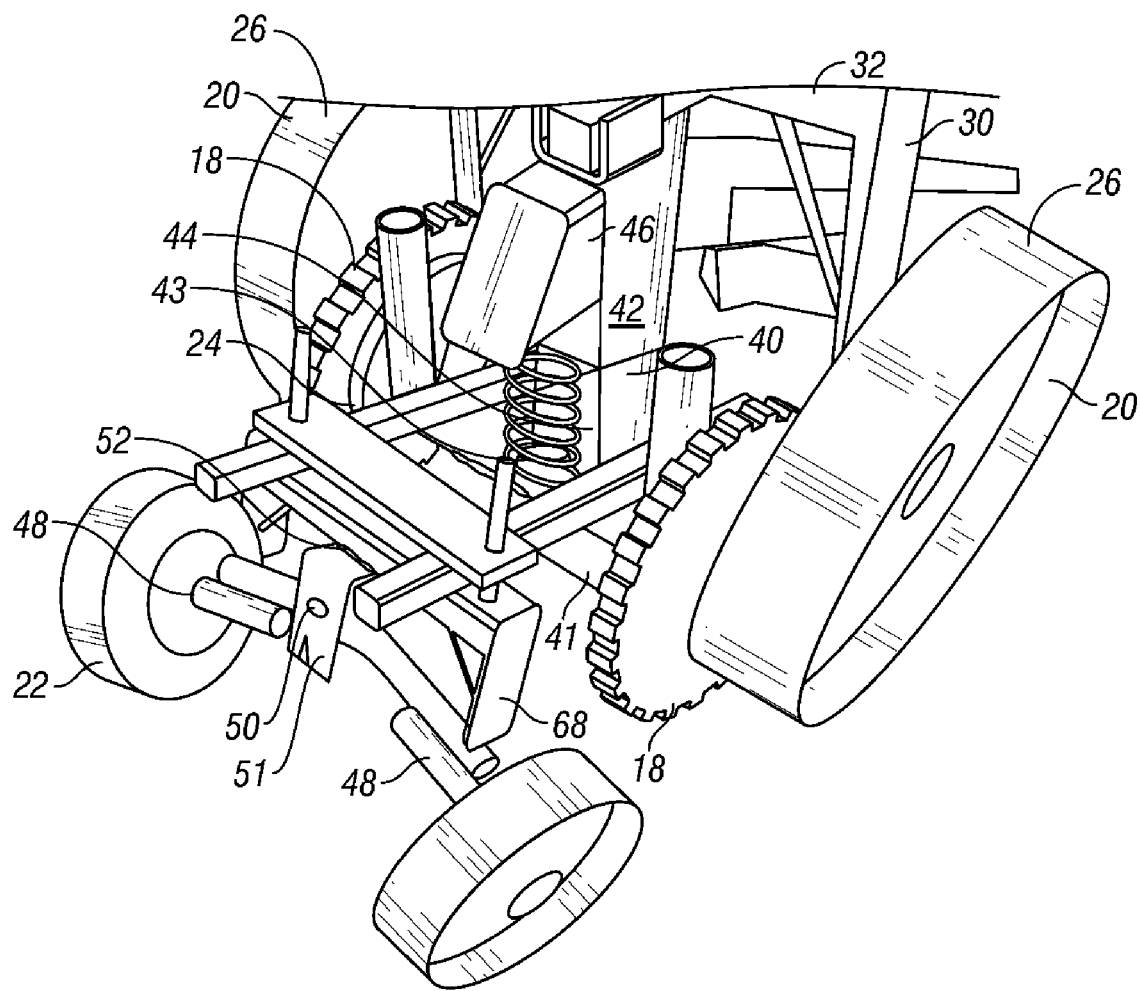
FIG. 2 is a perspective view of the nutrient device.
Figure 3:
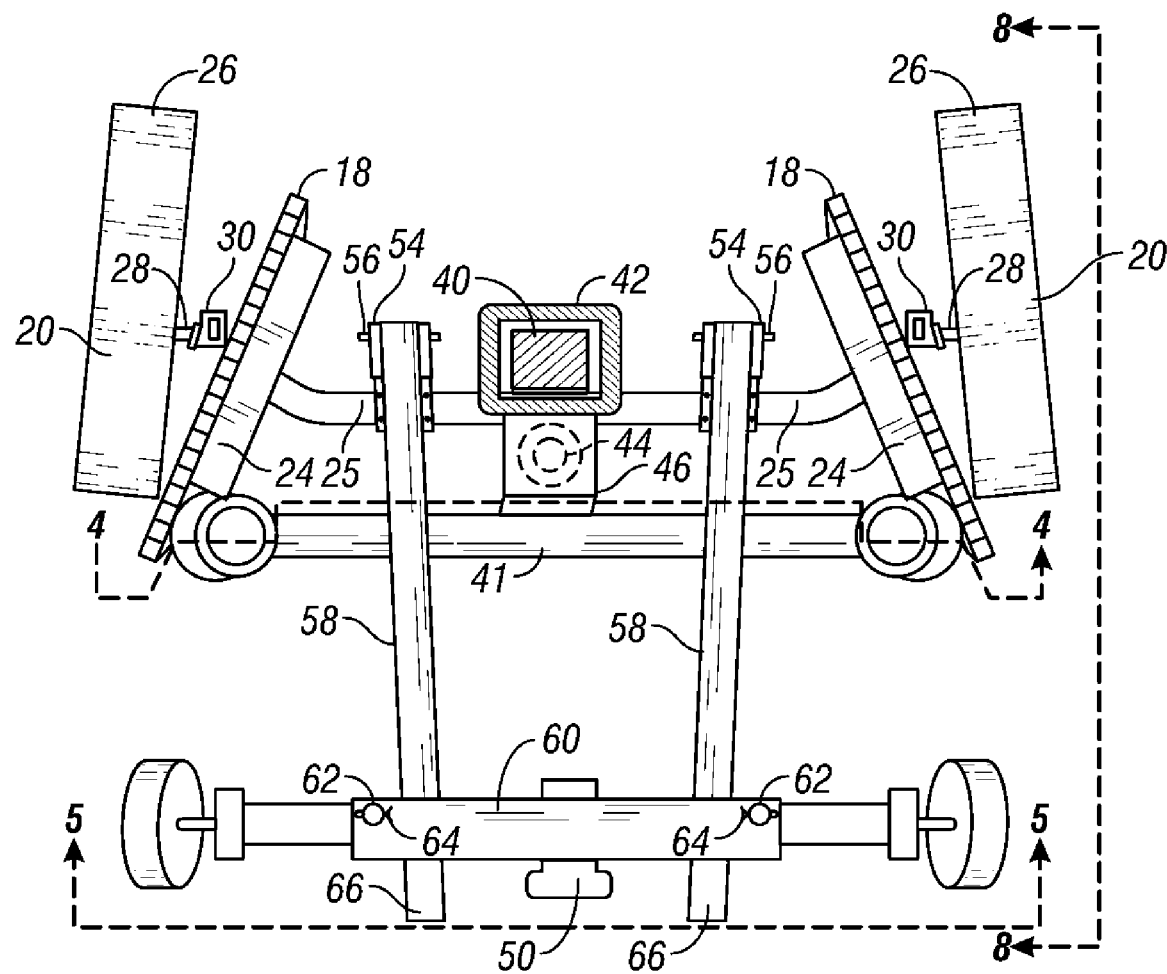
FIG. 3 is a top view of the device of the present invention.

Furthermore, an adjustment is provided by a square sliding pole 40 (FIG. 3) and by a slide 42 which surrounds the sliding pole 40. A cross bar 41 includes a plug 43 which fits within the lower end of a spring 44 as shown in FIG. 2. A projection 46 extends from the square sliding pole 40 (FIG. 3) so as to make the cleaning wheels 20, the vertical members 30, the cross member 32, the downward projection 35 (FIG. 4), and the sliding pole 40 as a unit. A counter movement is provided by coulters 18 and member 42 so that the cleaning wheels 20 can move relative to the coulters 18. This is provided by the sliding action of slide 42 with respect to sliding pole 40 against spring 44 as shown in FIG. 3.

The closer wheels 22 are provided at the rear of the operation. They provide a closer wheel axis 48 (FIG. 2) therein. A pivot point 50 is provided for the axles 48 so as to provide a pivot axis 50 that applies in the direction of the vehicle. A weld line 52 is provided at the upper end of member 51 so as to provide a weld to the yoke 68.

Links 54 (FIG. 3) include a pivot 56 thereon and a lower end which surrounds axis 25. The upper end pivots about member 56 and provides a pair of bars 58 which extend rearwardly to the rear ends 66 of bars 58. A hold down member 60 is slipped over pins 62 and is secured in place by a clip 64. Thus, the members 58 and the member 50 provide limited movement of the axles 48 (FIG. 2).

Figure 4:
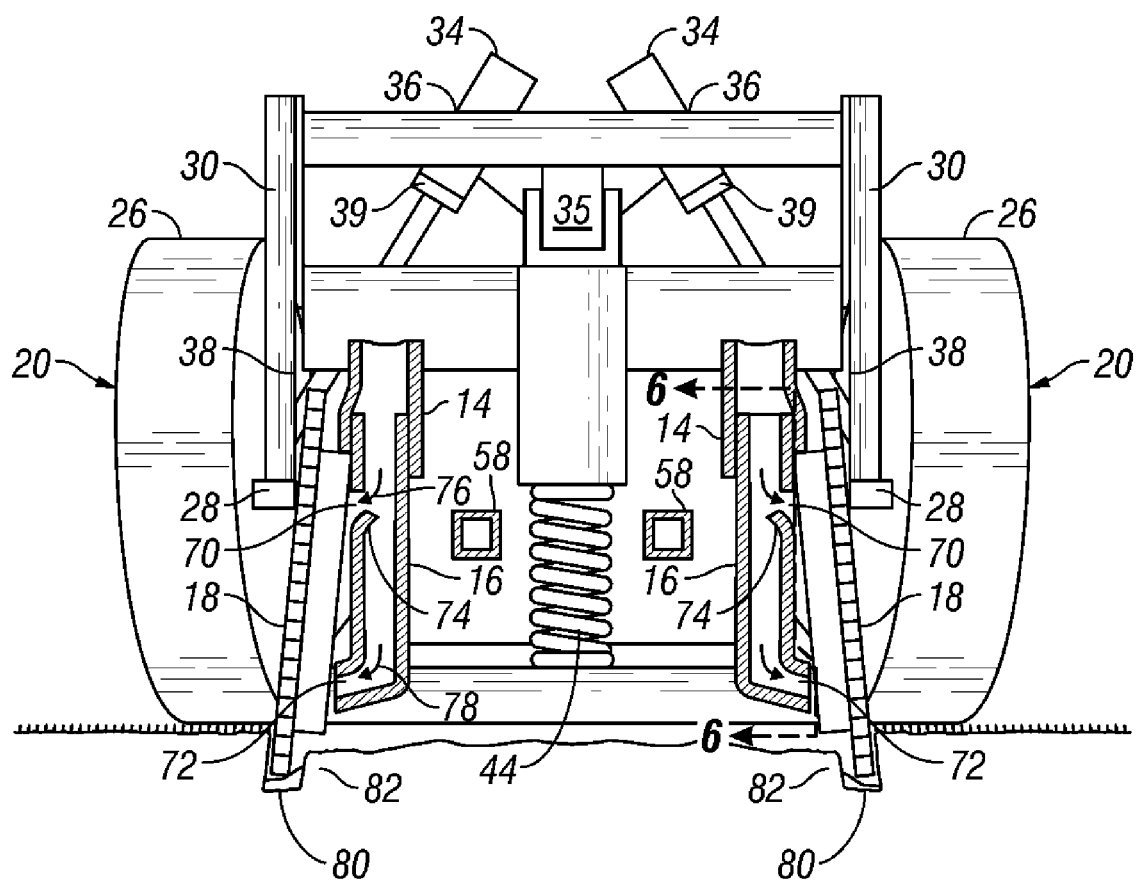
FIG. 4 is a sectional view taken along line 4-4 of FIG. 3.
Figure 6:
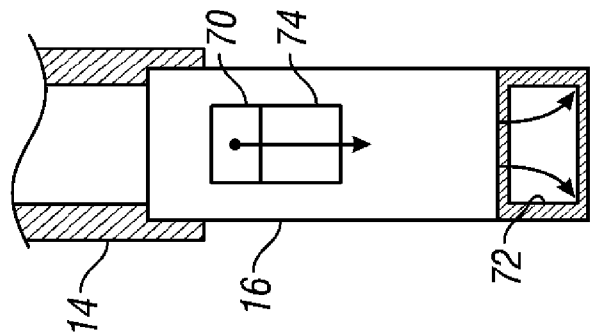
FIG. 6 is a view taken along line 6-6 of FIG. 4.
Figure 5:
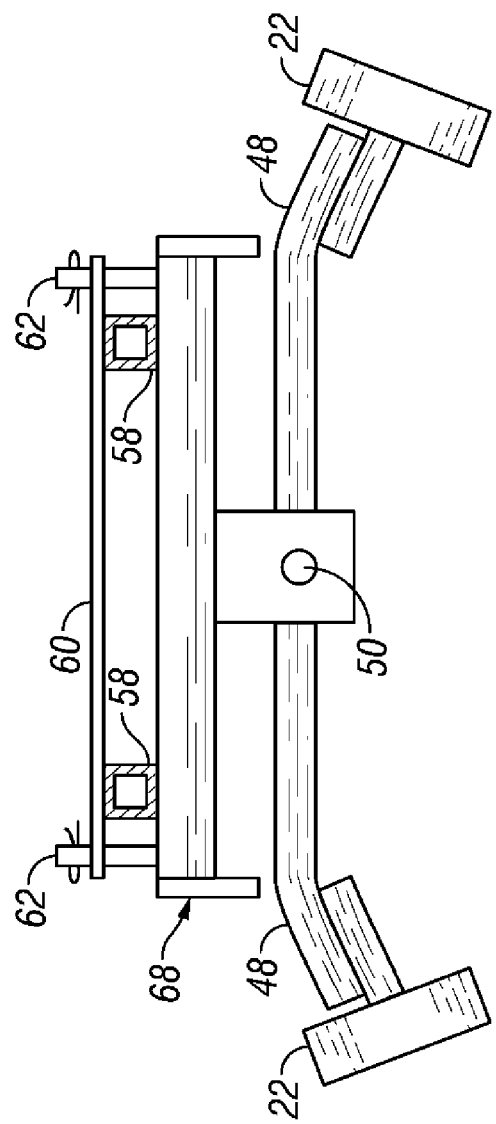
FIG. 5 is a sectional view taken along line 5-5 of FIG. 2.
Figure 7:
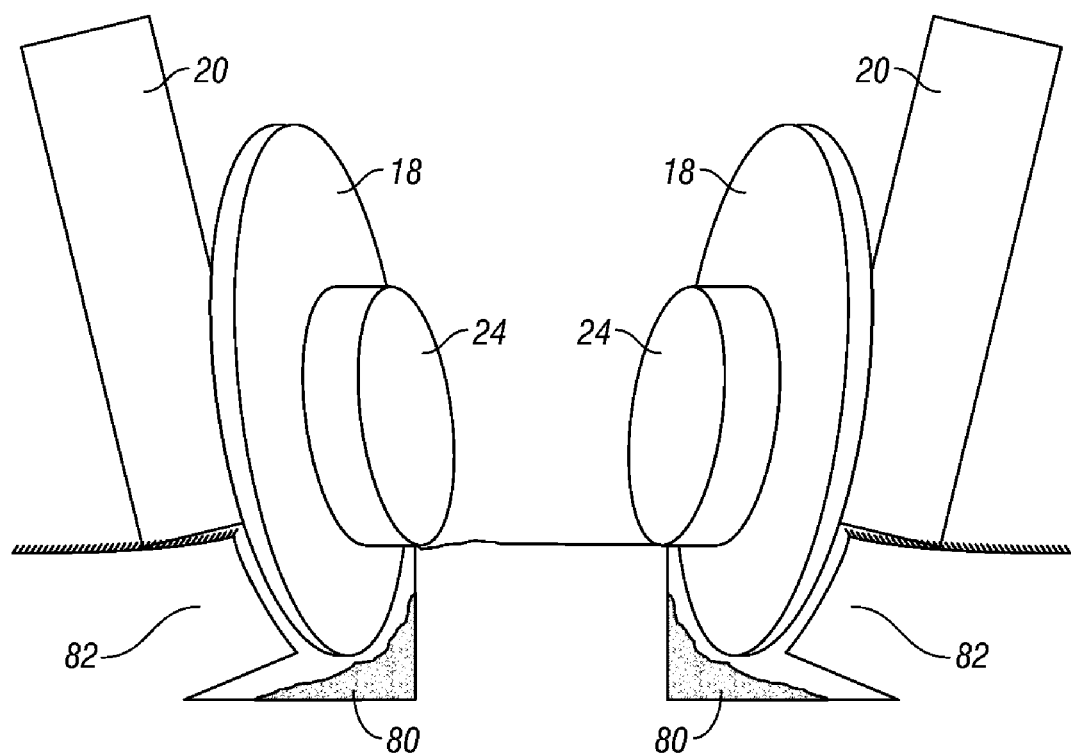
FIG. 7 is a rear view showing the relationship of the cleaning wheels, the coulter, and the back-up wheels and also shows the penetration of the ground.
Figure 8:
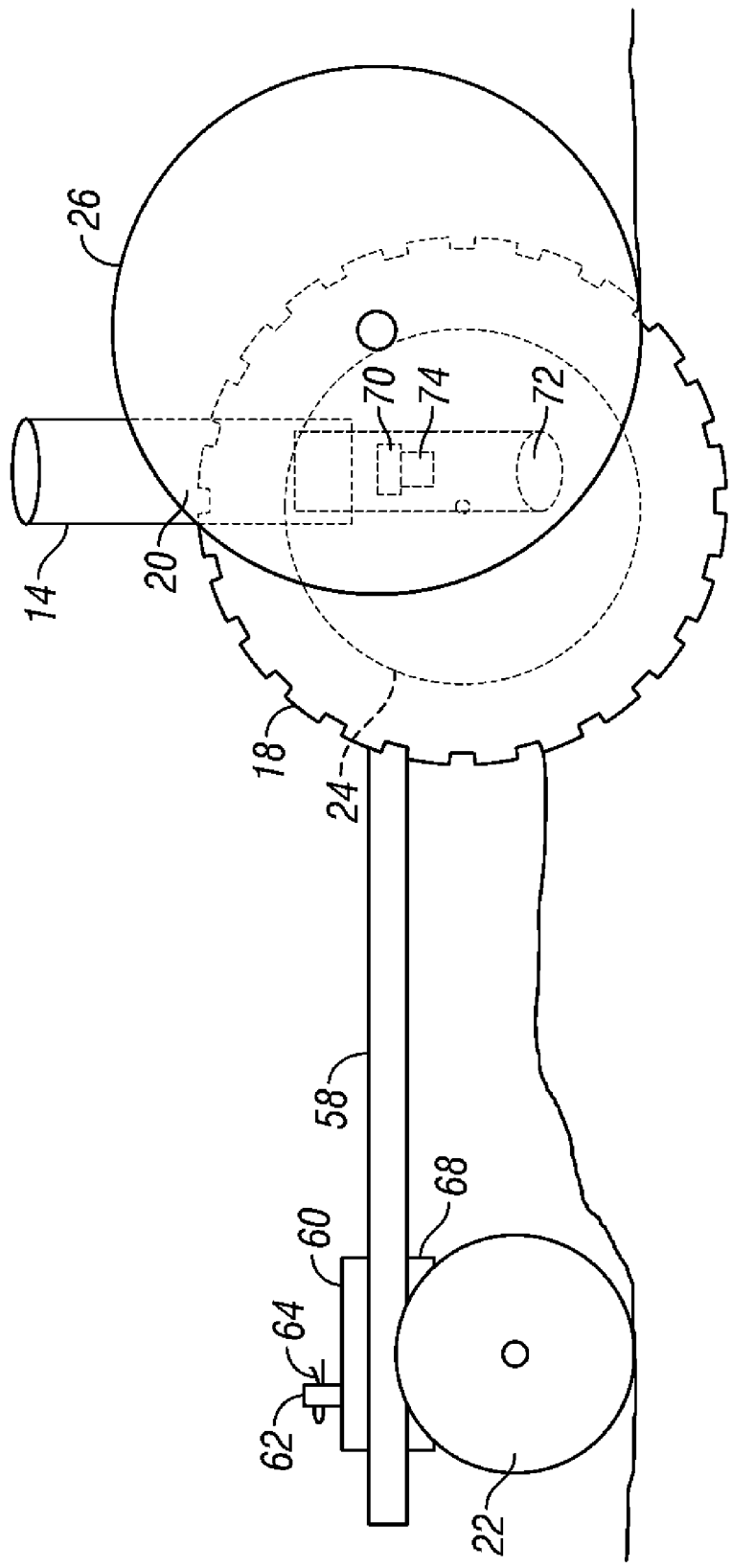
FIG. 8 is a side elevational view of the coulter, the back-up wheel, and the cleanup wheel.

Referring to FIG. 6, a limited opening 70 is provided adjacent the upper end of the inflexible member 16 and a larger opening 72 is provided at the lower end of inflexible member 16. Similarly, a tab 74 (FIG. 6 and FIG. 4) is provided and provides limited amount of the manure or nutrient being carried by conduit 16 as indicated by the arrow 76 (FIG. 4). Similarly, the arrow 78 is provided at the lower end 72. The method of operation of the nutrient device is as follows:

The frame is operated in a directional movement on the surface of the ground so that the frame has a rearward end and forward end. The coulter 18 is penetrated below the surface of the ground to a ground penetration level. The rotation of the cleaning wheel 20 about the cleaning wheel axis 28 creates a cleaning wheel 20 having a lower edge extending upwardly to an upper edge. The device is maintained at the lower edge of the cleaning wheel 20 in close proximity or touches the coulter 18 below the coulter axis and above the ground penetration level. The extending of the cleaning wheel 20 upwardly from the lower edge of the cleaning wheel 20 away in spaced relationship from the coulter 18 causes the cleaning wheel 20 to clean the coulter 18. A deposit 80 is made of the manure or nutrient in the trench created by the coulter 18 as it passed downwardly from coulter 18. The orientation of the coulters 18 causes the ground to be lifted as indicated at 82. The closing wheels 22 remove the sod 82 to its original position with manure or nutrient 80 below and sealed below sod 82. This is the result of the cleaning wheels 20 providing the action needed to close the ground as indicated at numeral 80 as indicated in FIGS. 4 and 7. The coulter 18 provides an opening action that opens the trench and yet permits the closer wheels 22 and the cleaning wheels 20 to close the ground after the nutrient 80 has been deposited in the soil.

The nutrient device and method of the present invention constitutes an improvement over prior devices. It includes cleaning wheels 20 that touch and clean the coulters 18. It also includes a manure or nutrients spouts that clean the coulters 18 and which place the manure or the nutrients below the soil. It includes minimization of the manure nutrients smell after the deposit and results in much less smell.

The coulters 18 taper from the front to the back progressively, and also are tapered from the top to the bottom progressively so as to open the trench and permit the deposit of the nutrient 80 therein.

The back-up wheels 24 are disposed at the same angle as the coulters 18 and rotate about the same axis as the coulters 18. Furthermore, as shown in FIG. 7, the back-up wheels 24 are slightly below the lowermost portions of the rims of cleaning wheels 20. The closer wheels 20 are canted inwardly.

The spring 44 provides flexibility between the coulters 18 and the cleaning wheels 20 so as to provide flexibility to the unit.

The spout includes a source of manure or nutrients at a small opening 70 above the lower end of the spouts for spreading on the coulter 18, and has a large opening 72 for depositing the nutrients or the manure on the coulters 18 and for applying beneath the ground. The device is efficient, convenient, and places the manure or nutrients below the ground without smell.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A nutrient device comprising:

a ground having a ground surface;

a coulter mounted for rotation about a coulter axis, the coulter penetrating the ground and making a ground penetration below the ground surface;

a cleaning wheel mounted for rotation about a cleaning wheel axis, the cleaning wheel having a circumferential flange parallel to the cleaning wheel axis, the circumferential flange of the cleaning wheel engaging the coulter below the coulter axis and above the ground penetration of the coulter;

the cleaning wheel extending upwardly from engaging the coulter to a cleaning wheel point spaced away from the coulter;

a conduit having an outlet positioned to deliver a nutrient onto the coulter for dispensing the nutrient into the ground penetration;

a closing wheel located to the rear of the coulter and the cleaning wheel for closing the ground penetration.

2. The nutrient device of claim 1 wherein the conduit has a hole above the outlet of the conduit, the hole for cleaning the coulter.

3. The nutrient device of claim 2 wherein the hole has a deflector for deflecting a portion of the nutrient toward the coulter, the remaining nutrient being directed to the outlet of the conduit.

4. The nutrient device of claim 1 wherein the closing wheel is canted with respect to the coulter.

5. The nutrient device of claim 1 wherein a back-up wheel is mounted adjacent to the coulter and includes a lower edge that is spaced slightly above the lower edge of the circumferential flange of the cleaning wheel.

6. The nutrient device of claim 1 wherein the cleaning wheel includes a cleaning wheel circumference that includes a flange thereon.

7. A nutrient device comprising:
a ground having a ground surface;
a frame having directional movement that includes a forward end and a rear end thereto;
a coulter mounted for rotation about a coulter axis and having a forward coulter end that is wider and a rear coulter end that is narrower with respect to the directional movement of the frame;
the coulter making a ground penetration below the surface of the ground;
a cleaning wheel mounted for rotation about a cleaning wheel axis, the cleaning wheel engaging the coulter above the ground penetration of the coulter and extending upwardly and away from the coulter;
a conduit having an outlet positioned to deliver the fertilizer onto the coulter for dispensing the fertilizer into the ground penetration;
a closing wheel located to the rear of the coulter and the cleaning wheel for closing the ground penetration.

8. The nutrient device of claim 7 wherein the closing wheel includes a pivot point that permits the closing wheel to pivot about a longitudinal closing wheel axis that is approximates the forward direction.

9. The nutrient device of claim 8 wherein the closing wheel includes a stop member that limits the pivoting of the closing wheel about the longitudinal closing wheel axis.

10. The nutrient device of claim 7 wherein a depth control wheel that rotates about the coulter axis and includes a depth control wheel lower edge that extends below a lowermost edge of the cleaning wheel.

11. The nutrient device of claim 7 wherein a slide frame is mounted for sliding movement relative to a slide, the slide frame and the slide being mounted between the cleaning wheels and the coulter and permitting the cleaning wheel to flex relative to the coulter.

12. A method for operating a nutrient device comprising:
operating a frame in a directional movement on a surface of ground so that the frame has a rearward end and a forward end;
penetrating a coulter below the surface of the ground to a ground penetration level;
rotating a cleaning wheel about a cleaning wheel axis, the cleaning wheel having a lower edge and extending upwardly to an upper edge;
maintaining the lower edge of the cleaning wheel in close proximity to the coulter below the coulter axis and above the ground penetration level;
extending the cleaning wheel upwardly from the lower edge of the cleaning wheel away in spaced relationship from the coulter;
positioning a conduit for delivery of a nutrient onto the coulter, whereby the nutrient passes from the coulter into the ground penetration;
pressing downwardly with a closing wheel at the rearward end of the coulter for closing the surface of the ground.

* * * * *